United States Patent [19]

Chamo

[11] Patent Number: 5,222,635
[45] Date of Patent: Jun. 29, 1993

[54] DISPENSER FOR GRANULAR PRODUCTS

[76] Inventor: Carlos J. M. Chamo, 235 SW. Le Jeune Rd., Miami, Fla. 33134

[21] Appl. No.: 947,219

[22] Filed: Sep. 18, 1992

[51] Int. Cl.⁵ ............................................. G01F 11/00
[52] U.S. Cl. ..................................... 222/306; 222/368
[58] Field of Search ............... 222/153, 175, 305, 306, 222/308, 345–340, 349, 351, 363, 366, 367, 368, 466, 370

[56] References Cited

U.S. PATENT DOCUMENTS

| | | | |
|---|---|---|---|
| 1,269,451 | 6/1918 | Jackson | 222/306 |
| 1,353,467 | 9/1920 | Fietsch | 222/306 |
| 1,916,781 | 7/1933 | Blatchford | 222/311 |
| 2,820,577 | 1/1958 | Winters et al. | 222/308 |
| 3,147,893 | 9/1964 | Mittelsteadt | 222/306 |
| 3,152,733 | 10/1964 | Ross | 222/351 |

Primary Examiner—Andres Kashnikow
Assistant Examiner—Philippe Derakshani
Attorney, Agent, or Firm—Jesus Sanchelima

[57] ABSTRACT

A device for dispensing predetermined amounts of granular material such as insecticides, fertilizers and the like. The device provides for a valve actioned by a moving a floating cup member that is particularly useful in preventing the jamming of the device by particles of irregular size. A crank handle assembly imparts the rotational movement to a cylindrical member that has a radial through opening wherein one or two cavities are defined to accept the material coming from the feeding tubular port. The material is dispensed every time the crank handle is rotated 180°. A user can use different terminating members that are removable attached to a spout member.

11 Claims, 3 Drawing Sheets

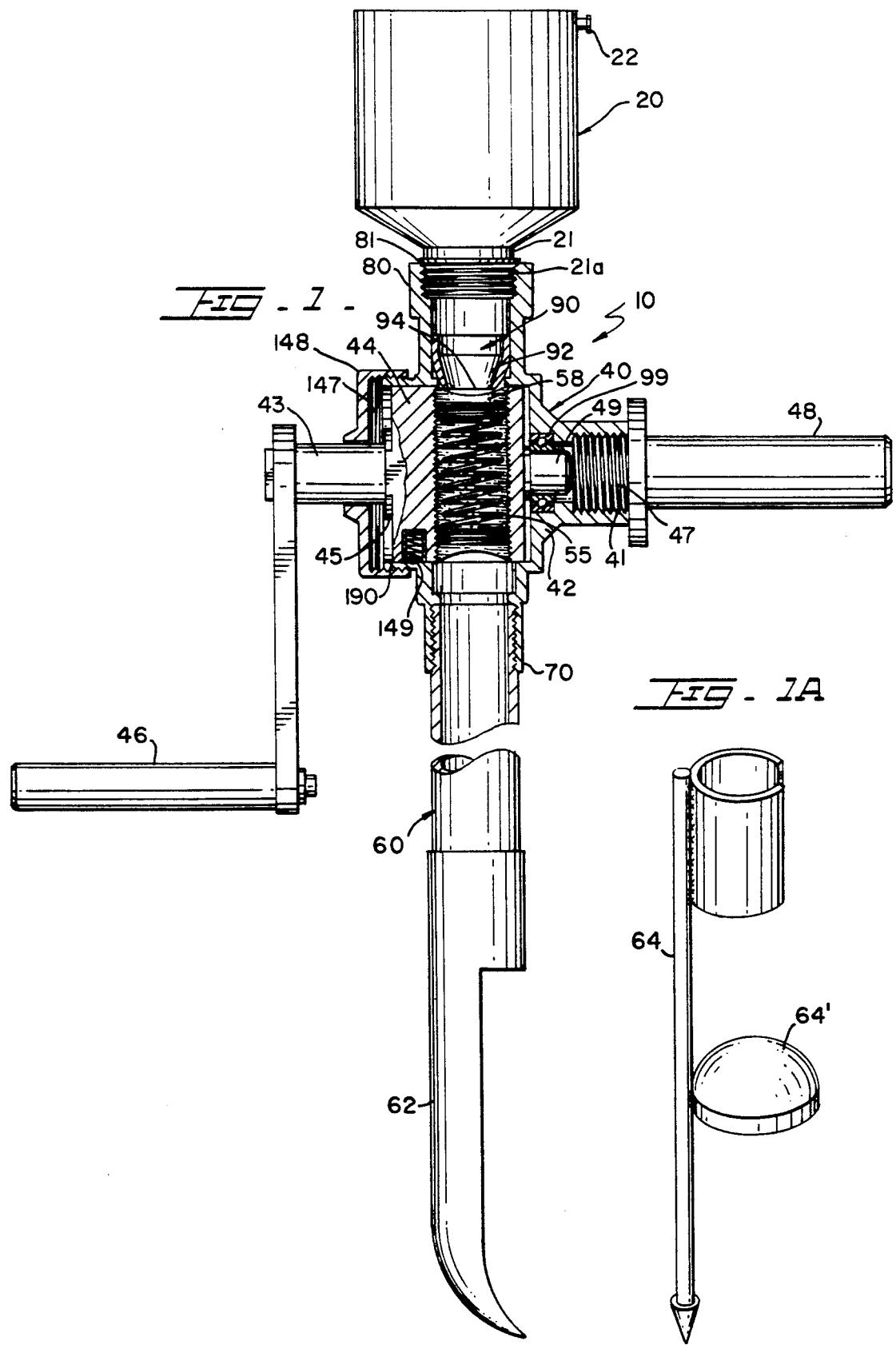

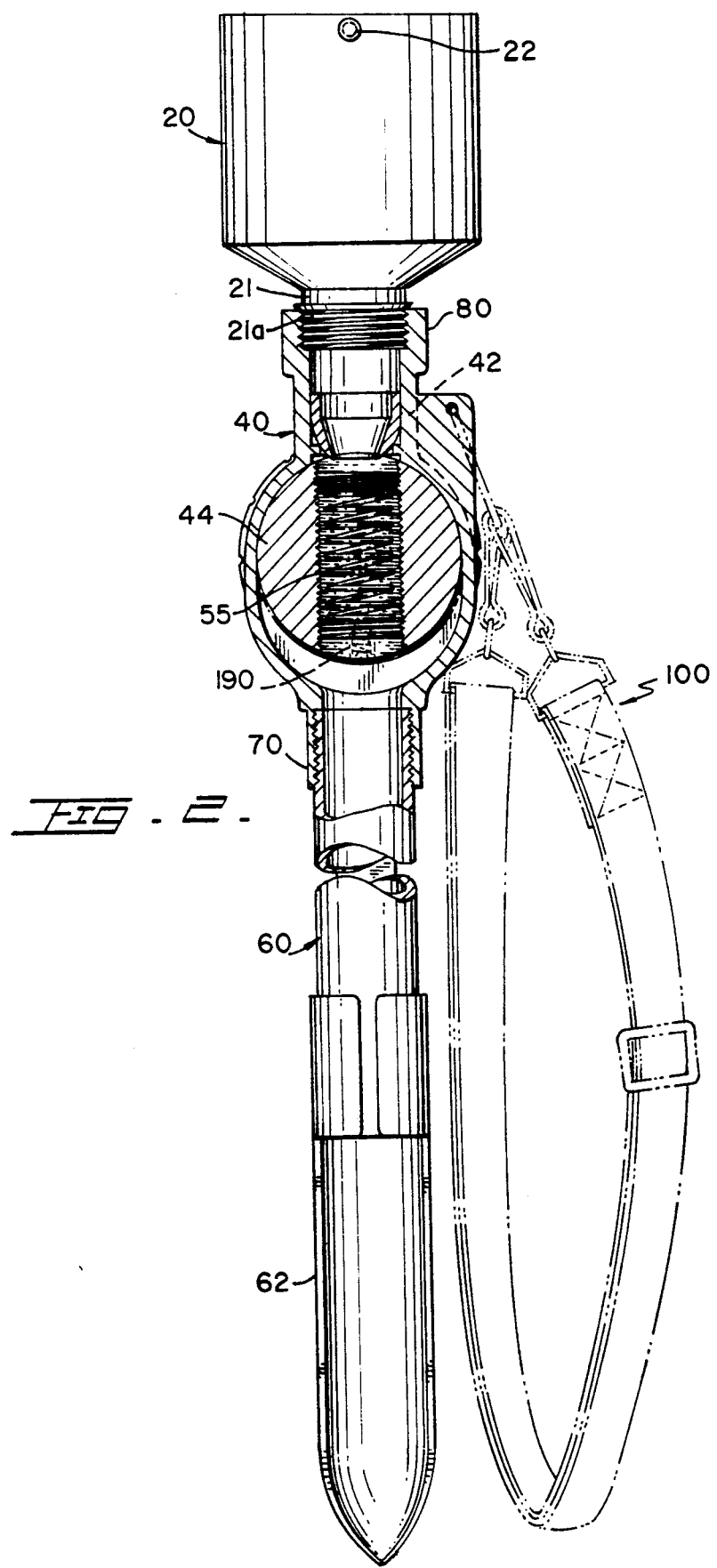

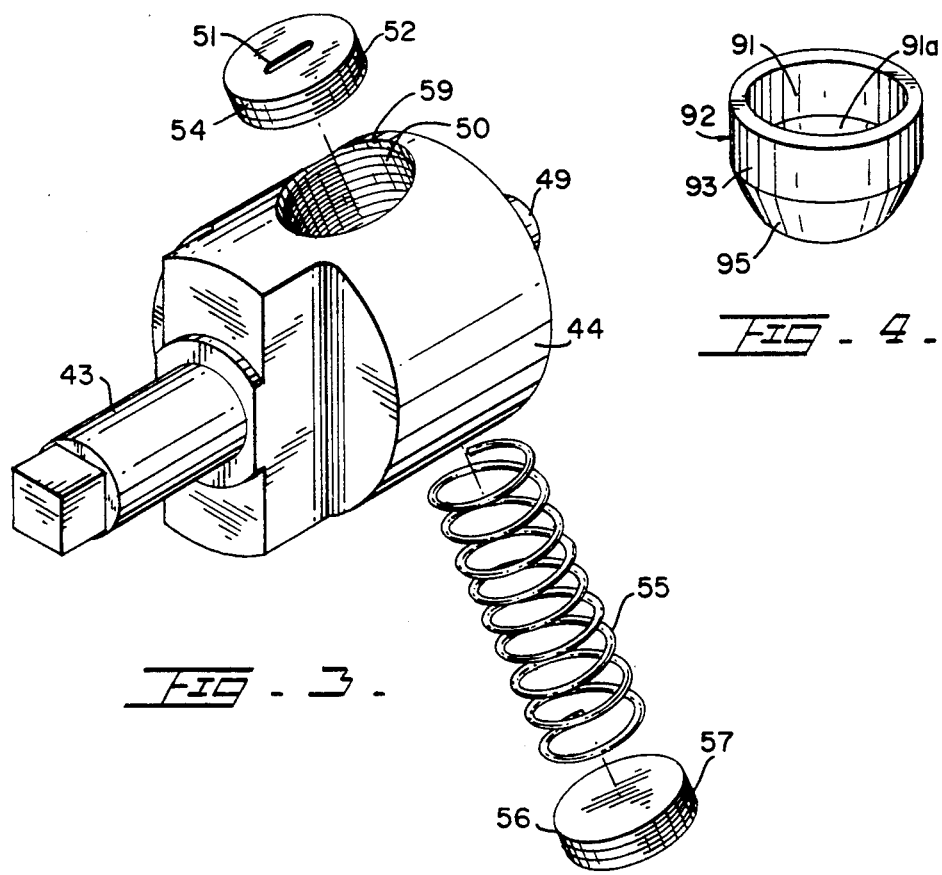
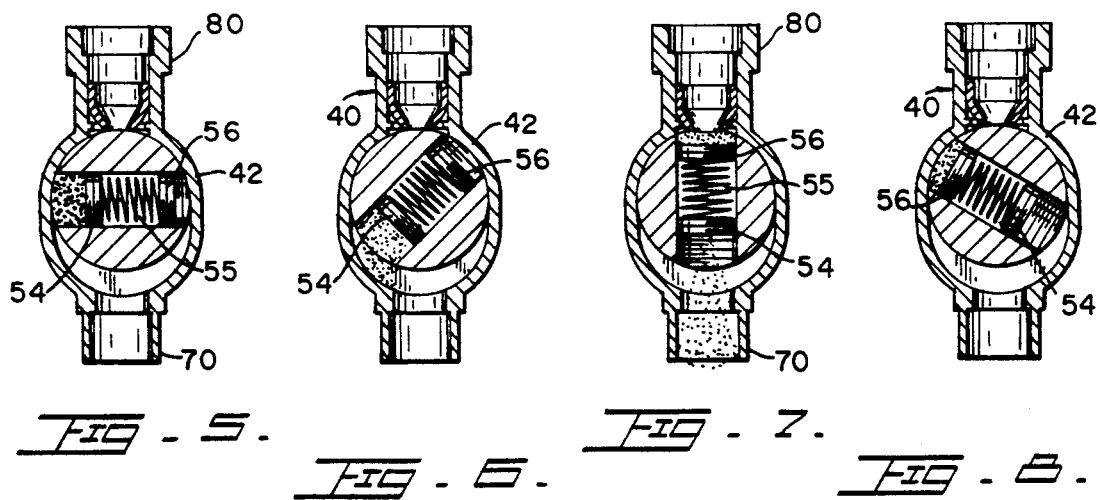

5,222,635

DISPENSER FOR GRANULAR PRODUCTS

BACKGROUND OF THE INVENTION

1. Field of the Invention

The present invention relates to dispensers for granular products, and more particularly, to such dispensers that are capable to control the amount to be dispensed.

2. Description of the Related Art

Several devices have been designed in the past to dispense granular products such as seeds, insecticides, fertilizers, etc. One of these designs is disclosed in U.S Pat. No. 1,916,781 issued to Blatchford wherein a seeder is disclosed for controlling and regulating the discharge of seeds. One of the problems with this device, which is a characteristic of other granular material dispensers, is that the opening through which the material goes through and the element that closes the opening may get jammed by granular elements of irregular form and size. This not only interrupts the operation but also may cause the dispensing of different unintended amount of the material. Not infrequently, these interruptions require a user to get physically involved with the mechanism of the device and come in contact with the granular material being dispensed. In case of toxic material, this is a disadvantage since it possesses a health threat to the user.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a reliable dispenser for granular products that can be used with regular and irregular shape granular material.

It is another object of this present invention to provide a dispensing device wherein the user can control the amount of material being dispensed repetitively.

It is still another object of this present invention to provide a device that can readily dispense two predetermined amounts of material.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a partial front elevational cross-sectional view of the present invention.

FIG. 1-A shows represents a variation of the spout assembly incorporating a dispersing accessory mounted thereto.

FIG. 2 shows a partial side elevational cross-sectional view of this invention.

FIG. 3 illustrates the cylinder member housed by the dispensing assembly and the adjusting cylindrical and spring members shown in an exploded view.

FIG. 4 is a representation of a cup member.

FIG. 5 shows a dispensing assembly cross-sectional view with the cylinder member in the 0 degrees position.

FIG. 6 show a dispensing assembly cross-sectional view with the cylinder member in the 45 degrees position.

FIG. 7 show a dispensing assembly cross-sectional view with the cylinder member in the 90 degrees position.

FIG. 8 show a dispensing assembly cross-sectional view with the cylinder member in the 135 degrees position.

DETAILED DESCRIPTION OF THE PREFERRED EMBODIMENT

Referring now to the drawings, where the present invention is generally referred to with numeral 10, it can be observed that it basically includes a storage container assembly 20 removably engaged to dispensing assembly 40, which in turn is connected to an elongated tubular spout assembly 60. Strap member 100 is cooperatively attached to device 10, as seen in FIG. 2, so that a user can carry it by putting strap member 100 over his/her neck, preferably. Referring now to storage container assembly 20, it can be seen in FIGS. 1 and 2 that it is basically a container with a breathing port 22, that permits the air to come in to minimize the creation of a partial vacuum that may impede the gravitational fall of the granular material contained therein. Neck 21 of container assembly 20 includes a threaded portion 21A for readily engagement with inner thread 81 of tubular feeding port 80 in dispensing assembly 40. Dispensing assembly 40 includes a housing 42, wherein cylinder member 44 is rotatably mounted. Cylinder member 44 includes co-axially extending shaft 43 rigidly mounted to one end and spacing member 45. Member 45 is intended to minimize the friction between the abutting surfaces of cylinder member 44 and internal surface 147 of threaded cap member 148. Crank handle 46 permits a user to impart rotational movement to cylinder member 44. Crank handle assembly 46 is rigidly mounted to shaft 43. The other end of cylinder member 44 includes second shaft 49 which is journaled by ball bearing assembly 99. Fixed handle member 48 is rigidly mounted to housing 42, so as to permit a user to hold device 10 while actuating a crank handle assembly 46. In the preferred embodiment, handle member 48 has a threaded end 47 that is cooperatively received by a threaded opening 41.

As best seen in FIG. 3, cylinder member 44 includes a radial through opening 50 that includes an internal thread 52. Adjusting cylinder members 54 and 56 are cooperatively housed within the threaded radial through opening 50 and, they also contain a mating thread on the outer surfaces 52 and 57. In this manner, adjusting cylinder members 54 and 56 can travel along the entire length of radial through opening 50.

Sandwiched between adjusting cylindrical 54 and 56 is spring member 55 that is kept in its compression state and urges adjusting cylindrical members 54 and 56 lockingly outwardly. Adjusting cylindrical members 54 and 56 include slot 51 that permits a user to use flat screw driver, in the preferred embodiment, to rotate them thereby causing it to advance in both directions along the through opening 50. Depending on how close to the surface of cylinder member 44 the adjusting cylinder members 54 and 56 will define cavity 58 that will in turn determine the capacity of the granular product deposited.

When crank handle assembly 46 rotates 180 degrees a predetermined amount o the granular material will be dispensed through outlet port 70 and then to tubular spout member 60. It is possible to graduate or position adjusting cylinder members 54 and 56 at different distances from the surface so that a user may have the option of two predetermined amount of granular material to be dispensed. Tubular spout member includes removably mounted terminating member 62 which directs (or concentrates) the granular product being dispensed in one direction. An alternate embodiment is shown in FIG. 1A where the terminating member is referred to with numeral 64 and it includes dispersing surface 64' that is intended to accomplish the opposite of what terminating member 62 does.

Housing 42 includes a tubular feeding port 80 that connects with a container assembly and houses valve assembly 90. Valve assembly 90 includes floating cup member 92 that is cammingly actuated when cylinder member 44 is rotated. Floating cup member 92 has an opening 94 at its central bottom that permits the flow of the granular material coming through the feeding tubular port 80. The inner surfaces 91 and 91a of floating cup member 92 provide for cylindrical and frusta-conical wall that through gravity guide the granular material downwardly through opening 94. The outer surface of floating cup member 92 includes lateral wall 93 and frusta-conical wall 95 and continues to define its bottom surface and opening 94 is located. In this manner, after the granular material has been deposited in the space defined by adjusting cylindrical members 54 and 56, the smooth cammingly action of edge 59 of the radial through opening 50 against the lowermost portion of wall 95 of floating cup member 92 to cause it to move upwardly within feeding tubular port 80. This will prevent any irregular particular from jamming the internal edge of radial through opening 50 while providing the necessary cutting action when cylinder member 44 is turned. This is specially critical with granular material of irregular shape.

In FIGS. 5 through 8, it can be observed how cylinder member 44 rotates, cammingly causing floating cup member 92 to move up and down reciprocally within feeding tubular port 80 accepting and dispensing a predetermined amount of granular material. The predetermined amount of granular material to be accepted and dispensed is controlled by adjusting the travel of adjusting cylindrical members 54 and 56. In the preferred embodiment, the amounts of granular material is the same but as shown in FIGS. 5;6;7 and 8, it can also be different for applications that may require different amounts. In most applications, however, adjusting cylindrical members will be adjusted to dispense substantially the same amount of granular material.

Spring biased ball assembly 190 cooperatively and cammingly engages with opening 149 in housing 42 to provide a user for an indication of a predetermined position of cylinder 44. Preferably, the zero degrees position for threaded radial through opening 50 has been selected in the preferred embodiment. Additionally, spring biased ball assembly 190 provides a lock for crank handle assembly 46 when not being actuated to prevent accidentally dispensing any product.

What is claimed is:

1. A device for dispensing predetermined amounts of granular material, comprising:
   A. a dispensing assembly having a housing including a feeding tubular port and an outlet port and a rotably mounted cylinder member therein and said cylinder member including a threaded radial through opening and further including dispensing capacity adjusting means cooperatively mounted within said radial through opening and said cylinder member having two ends and one of said ends being rotatably journaled by said housing;
   B. container means for storing said granular material and being removably connected to said feeding tubular port;
   C. crank handle means rigidly mounted to the other end of said cylinder member for imparting a rotational force to said cylinder member;
   D. a cup member having a bottom surface and an opening defined thereon and being housed within said feeding tubular port so that a predetermined distance is reciprocally traveled by said cup member in response to the cammingly action of said cylinder member and said cup member being cooperatively disposed to permit the flow of said granular material through there; and
   E. a spout member being removably connected to said outlet port.

2. The device set forth in claim 1 wherein said dispensing capacity adjusting means includes at least one adjusting cylinder member including an outer threaded outer wall that cooperatively engages within said threaded radial through opening thereby defining a cavity between said adjusting cylinder member and said threaded radial through opening wherein said granular material is deposited when said threaded radial through opening coincides with said feeding tubular pot.

3. The device set forth in claim 2 wherein said dispensing capacity adjusting means includes two adjusting cylinder members and further includes a spring member sandwiched between said adjusting cylinder members so that said adjusting cylinder members are lockingly kept in place.

4. The device set forth in claim 3 wherein said spout member includes a removably terminating member that causes said granular material to concentrate in a given direction as it is being dispensed.

5. The device set forth in claim 4 wherein said cylinder member includes a spring biased ball member and said housing includes an opening that cooperatively and cammingly receives said spring biased ball member to lock said cylinder members in place with respect to said housing.

6. The device set forth in claim 5 further including strap means for supporting said device and said strap means being removably mounted to said housing.

7. The device set forth in claim 6 wherein said housing includes a fixed handle member mounted thereon co-axially disposed with respect to said cylinder member and opposite to said crank handle member.

8. The device set forth in claim 3 wherein said spout member includes a removably terminating member that causes said granular material to disperse as it is being dispensed.

9. The device set forth in claim 8 wherein said cylinder member includes a spring biased ball member and said housing includes an opening that cooperatively and cammingly receives said spring biased ball member to lock said cylinder members in place with respect to said housing.

10. The device set forth in claim 9 further including strap means for supporting said device and said strap means being removably mounted to said housing.

11. The device set forth in claim 10 wherein said housing includes a fixed handle member mounted thereon co-axially disposed with respect to said cylinder member and opposite to said crank handle member.

* * * * *